L. O. CORWIN & W. M. ARNOLD.
SPRING WHEEL.
APPLICATION FILED MAR. 19, 1913.

1,138,194.

Patented May 4, 1915.

UNITED STATES PATENT OFFICE.

LAWRENCE O. CORWIN AND WILEY MOSES ARNOLD, OF KEENE, TEXAS.

SPRING-WHEEL.

1,138,194. Specification of Letters Patent. Patented May 4, 1915.

Application filed March 19, 1913. Serial No. 755,436.

*To all whom it may concern:*

Be it known that we, LAWRENCE O. CORWIN and WILEY M. ARNOLD, citizens of the United States, residing at Keene, in the county of Johnson and State of Texas, have invented certain new and useful Improvements in Spring-Wheels, of which the following is a specification.

Our present invention comprehends certain new and useful improvements in vehicle wheels, and the primary object of the invention is to provide an improved resilient wheel wherein spring members are interposed between the hub and the rim maintaining them in yielding relation.

A further object of our invention contemplates the provision of suitable means including a plurality of radially resilient springs, so positioned in relation to the rim, as to effectively resist all strains tending to displace the hub from its position in the same plane with that of the rim.

A still further object of our invention resides in the provision of specially constructed resilient members, interposed between the main springs and the rim whereby the shock attending lateral strain, as well as the driving and side strains, brought to bear upon the rim during the turning of the wheel, is absorbed.

A still further object of our invention is to provide a novel and peculiar hub spring so constructed as to receive and absorb a portion of the shock imparted to the wheel during its rotation.

The above and additional objects are accomplished by such means as are illustrated in their preferred embodiment in the accompanying drawings, described in the following specification, and then more particularly pointed out in the claim which is appended hereto and forms a part of this application.

In describing our invention in detail reference will be had to the accompanying drawings wherein like characters denote like or corresponding parts throughout the several views, and in which:—

Figure 1:
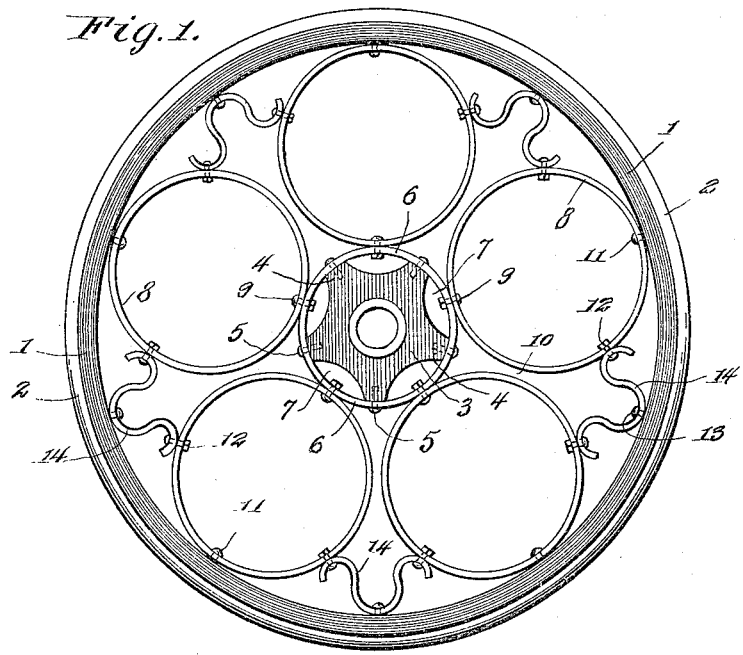
Figure 2:
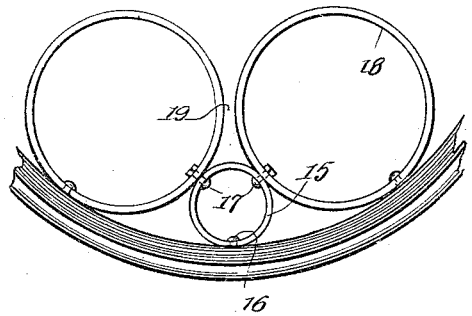

Figure 1 is an elevation of a wheel constructed in accordance with our invention. Fig. 2 is a similar view, partly broken away, of a modification.

Proceeding now to the description of the drawings, wherein is illustrated the preferred form of our invention the numeral 1 designates the wheel rim or felly, and 2 a rubber tire, both of which may be varied or changed as desired without in any way affecting the utility of the invention, as neither form a part thereof, and are only shown to illustrate the application of the invention.

Concentrically mounted within the rim and normally in the same plane therewith, I provide a wheel hub 3, composed preferably of any suitable material such as metal, and having a plurality of uniformly spaced apart radiating integrally formed projections 4, upon the periphery or outer face of which is mounted, through the medium of bolts 5, a metallic band or collar 6, the purpose of which will be hereinafter fully described. By this construction an opening or space 7 is formed between the said band and the hub, thereby allowing the band to yieldingly support a plurality of metal hoops 8 secured to the said band by means of a plurality of bolts 9, each blade being disposed midway between two of the projections 4, so as to allow the band 6 to yield or give should sufficient weight be brought to bear upon the periphery thereof by reason of the band 8 secured thereto. The said hoops 8 radiate from the bands 6 and are uniformly spaced apart as is shown at 10 to allow the same to be compressed or flattened during the rotation of the wheel, should sufficient weight be brought to bear upon the rim. Each hoop is secured to the inner periphery of the rim through the medium of a bolt 11 thereby preventing lateral movement of the hoop and retaining the same in absolute alinement and upon the same plane with the hub 3 of the wheel. Between the hoops and secured thereto by means of a blade 12 and also secured to the inner periphery of the rim 1 as at 13 we have provided a specially formed spring member 14 hereinafter to be designated as a "double-S" spring. The provision of this spring not only prevents rotation of the hoops 8, should the bolts 9 and 11 loosen for any unforeseen reason, but they also absorb a portion of the shock brought to bear upon the rim during the rotation of the wheel, as well as retain the hoops 8 in a normal position with the space 10 therebetween.

Referring now to the modification shown in Fig. 2 the "double-S" spring has been dispensed with and a small hoop spring 15 secured as at 16 to the inner periphery of the rim has been provided, same being attached as at 17 to the larger hoops 18 for supporting the same in spaced relation as is shown at 19. Although the result attained in the modified form is substantially the same as that of the preferred form, the latter upon practical application of the invention has been found superior for the purposes desired.

It will be seen from the above taken in connection with the accompanying drawings that by the provision of the opening 7 between the band 6 and the hub 3 the said band is permitted to yieldably support the hoops 8 as desired; that through the provision of the "double-S" springs, disposed as they are between the hoops 8, the latter are normally held in spaced relation, thus preventing frictional engagement and wear upon the said hoops; and that the manner of securing and supporting the hub is such as to retain the same in alinement with and in substantially the same plane as the rim at all times.

It will be understood that the above description and the accompanying drawings comprehend only the general and preferred embodiments of our invention, and that various minor changes may be made within the scope of the appended claim and without sacrificing any of the advantages of our invention.

Having thus fully described our invention, what we claim as new and desire to secure by Letters Patent, is:—

In a resilient wheel, the combination of a non-resilient felly, a band within and concentric with the felly, a hub within and supporting said band having spaced spokes to which the band is directly fastened, a series of springs constructed to yield radially and circumferentially interposed between the band and the felly engaging the band at points intermediate the spokes, and arranged non-contiguous with each other tangentially to the band, and second springs, said second springs being arranged intermediate said first mentioned springs without a circle passing through their centers, and said second springs being fastened directly to the felly and the adjacent two springs of the first mentioned springs.

In testimony whereof we affix our signatures in presence of two witnesses.

LAWRENCE O. CORWIN.
WILEY MOSES ARNOLD.

Witnesses:
WAT REED,
E. RANDOLPH.

Copies of this patent may be obtained for five cents each, by addressing the "Commissioner of Patents, Washington, D. C."